United States Patent [19]

Satcher

[11] 4,296,064

[45] Oct. 20, 1981

[54] METHOD AND STRUCTURE FOR RECYCLING SOAP CHIPS

[76] Inventor: Angel T. Satcher, 164 NE. 82 Ter., Miami, Fla. 33138

[21] Appl. No.: 165,604

[22] Filed: Jul. 3, 1980

[51] Int. Cl.[3] .............................................. B29C 1/00

[52] U.S. Cl. ...................................... 264/322; 252/90; 264/37; 264/320; 264/330; 264/DIG. 69

[58] Field of Search ................ 264/DIG. 69, 37, 320, 264/322, 330; 252/90, 92

[56] References Cited

U.S. PATENT DOCUMENTS

| | | | |
|---|---|---|---|
| 1,601,775 | 10/1926 | Scherieble | 252/90 |
| 3,557,006 | 1/1971 | Ferrara | 252/90 |
| 3,931,035 | 1/1976 | Brown | 252/90 |

*Primary Examiner*—James H. Derrington
*Attorney, Agent, or Firm*—John Cyril Malloy

[57] ABSTRACT

A method for recycling soap chips in a particular structure including a container having a removable rack having four compartments and a heating element, the method comprising, placing the soap chips in the compartment, heating the soap chips, cooling the soap chips, removing the rack from the container and emptying out formed soap bars.

1 Claim, 2 Drawing Figures

METHOD AND STRUCTURE FOR RECYCLING SOAP CHIPS

FIELD OF THE INVENTION

This invention relates to soap and more particularly to a method and a structure for recycling soap chips.

BACKGROUND OF THE INVENTION

In the past many people have thrown out small pieces of soap when they have become too small for conventional use. These small pieces of soap may be collected and utilized to be melted in the container to be described hereinafter into a new bar of soap which can then be used.

OBJECTS AND SUMMARY OF THE INVENTION

It is an object of this invention to provide a structure within which a rack may be suspended in a container and heated so that soap chips positioned in the rack will be melted into a flowable mass so that later, the rack may be removed, cooled and the soap removed as formed soap bars.

It is thus seen that this invention provides a simple and inexpensive means for preparing formed soap bars from a collection of smaller pieces of soap which are too small for regular use and, the same is, accordingly, an object of this invention.

In accordance with these and other objects which will become apparent hereinafter, the instant invention will now be described with reference to the accompanying drawings in which:

DESCRIPTION OF THE PREFERRED EMBODIMENT

Figure 1:
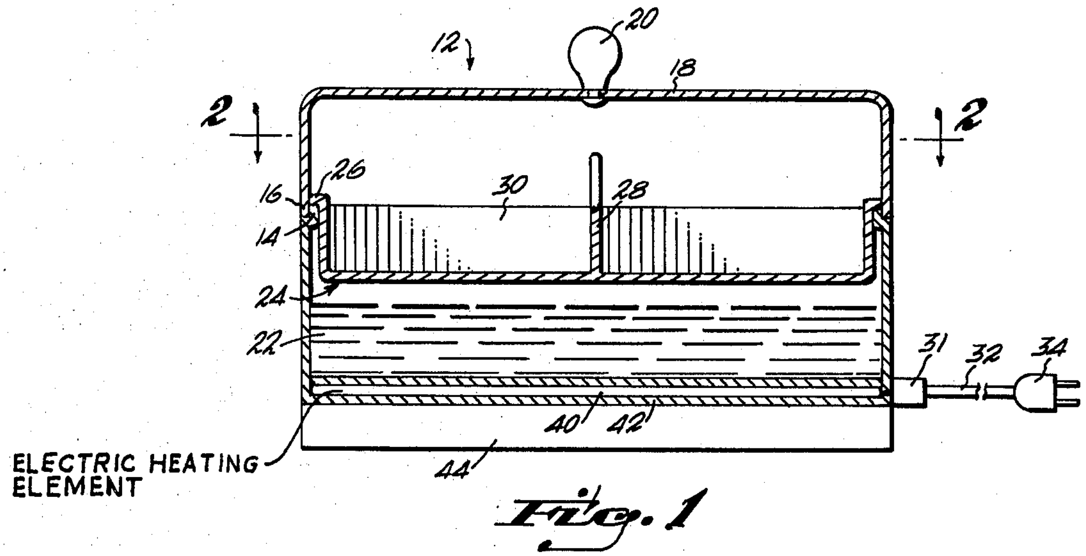
FIG. 1 is a longitudinal vertical sectional view of the soap recycling container of the present invention.
Figure 2:
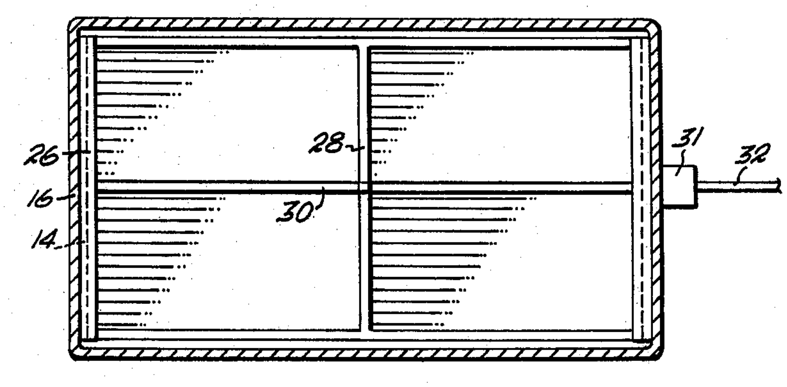
FIG. 2 is a longitudinal sectional view taken along line 2—2 in the direction of the arrows.

Referring to the drawings wherein like reference characters designate like or corresponding parts throughout the several views, there is shown a container 12 having an inwardly offset upper rim 14 sized to mate with the skirt 16 of a lid 18 having a handle 20. Within the container thus defined, water as at 22 is adapted to be positioned and, above the water, a rack 24 is suspended by means of its outwardly extending flange

26 on the rim 14. The rack may be separated by a septum 28 and 30 into four compartments. Within these compartments, soap chips are positioned and through an electrical connection plug 31 and a cord 32 leading to a plug 34 adapted to be connected to a source, a resistor element 40 within the bottom 42 may be heated while the device sits on a support 44. The result is that the water is heated, the soap chips are melted and new bars of soap are made first by being turned into a liquid in the four segments of the rack and, after heating, the rack is removed, allowed to cool and the soap pieces made from the chips are removed for use.

In use, the soap chips are gathered together and placed in the four compartments shown. The electrical heating means is activated and the soap chips are melted into the compartments, conforming the soap chips to the shape of the compartments. The heating means is deactivated and the rack cooled. The rack is then removed from the container and turned over, emptying the formed soap bars from the compartments.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A method of recycling soap chips wherein a container is utilized which comprises, an inwardly offset upper rim, the container including a floor, a space between the floor and the rim adapted to receive a charge of water therein, electrical heating means adjacent the container floor for heating the water in the container space, and separate rack including two septums perpendicular to one another, dividing the rack into four compartments; the rack compatibly mating with and suspended by the offset upper rim a predetermined distance above the water, the method comprising:

gathering chips of soap;

placing chips of soap into each of the compartments;

activating electrical heating means for heating water in container space;

melting the soap chips;

deactivating the heating means;

cooling the rack;

removing the rack from the container; and turning the rack over, emptying formed soap bars.

* * * * *